US008856714B2

(12) United States Patent
Hwang et al.

(10) Patent No.: US 8,856,714 B2
(45) Date of Patent: Oct. 7, 2014

(54) METHOD AND SYSTEM FOR DESIGNING 3D SEMICONDUCTOR PACKAGE

(71) Applicant: Samsung Electronics Co., Ltd., Suwon-si (KR)

(72) Inventors: Bo-Sun Hwang, Yongin-si (KR); Sung-Hee Yun, Seoul (KR); Jae-Hoon Jeong, Hwaseong-si (KR); Won-Cheol Lee, Seoul (KR); Tae-Heon Lee, Seoul (KR); Young-Hoe Cheon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/803,534

(22) Filed: Mar. 14, 2013

(65) Prior Publication Data

US 2014/0208284 A1      Jul. 24, 2014

(30) Foreign Application Priority Data

Jan. 18, 2013  (KR) ........................ 10-2013-0005996

(51) Int. Cl.
*G06F 17/50*      (2006.01)
*G06F 19/00*      (2011.01)

(52) U.S. Cl.
CPC ........ *G06F 17/5072* (2013.01); *G06F 2217/14* (2013.01); *G06F 17/5077* (2013.01); *G06F 19/00* (2013.01); *G06F 2217/12* (2013.01)
USPC ........... 716/122; 716/123; 716/127; 716/128; 716/129; 716/137; 716/138; 700/98; 700/118; 700/121

(58) Field of Classification Search
CPC ............ G06F 17/5072; G06F 17/5077; G06F 2217/12; G06F 2217/14; G06F 19/00
USPC ......... 716/122, 123, 127, 128, 129, 137, 138; 700/98, 118, 121
See application file for complete search history.

(56) References Cited

U.S. PATENT DOCUMENTS

| | | | | |
|---|---|---|---|---|
| 3,653,072 A | * | 3/1972 | Ballas et al. ................... | 716/119 |
| 5,404,033 A | * | 4/1995 | Wong et al. ................... | 257/202 |
| 6,407,434 B1 | * | 6/2002 | Rostoker et al. .............. | 257/401 |
| 6,490,713 B2 | | 12/2002 | Matsumoto | |
| 6,604,231 B2 | | 8/2003 | Kaneko | |
| 7,131,094 B2 | | 10/2006 | Kolk et al. | |

(Continued)

FOREIGN PATENT DOCUMENTS

| | | |
|---|---|---|
| JP | 2007250754 | 9/2007 |
| JP | 2008077404 | 4/2008 |
| JP | 2012003460 | 1/2012 |

*Primary Examiner* — Phallaka Kik
(74) *Attorney, Agent, or Firm* — Onello & Mello, LLP

(57) ABSTRACT

A three-dimensional semiconductor package and method for making the same include providing a first package layout parameter for a plurality of first terminals included in a first package, a second package layout parameter for a plurality of second terminals included in a second package disposed above or below the first package, and a connection terminal layout parameter for a plurality of connection terminals electrically connecting the first package and the second package; providing a first wiring connection layout between the first and second terminals and the connection terminals by applying a first process to the first package, second package, and connection terminal layout parameters; and providing a second wiring connection layout between the first and second terminals and the connection terminals by applying a second process, which is different from the first process, to the first wiring connection layout.

13 Claims, 15 Drawing Sheets

(56) References Cited

U.S. PATENT DOCUMENTS

| | | |
|---|---|---|
| 7,353,476 B2 | 4/2008 | Imada et al. |
| 7,464,348 B1 | 12/2008 | Lockman et al. |
| 7,884,481 B2 | 2/2011 | Hsieh |
| 7,949,984 B2 | 5/2011 | Tanamoto et al. |
| 8,122,397 B2 | 2/2012 | Lockman et al. |
| 8,634,948 B2 * | 1/2014 | Boronvinskih et al. ......... 700/95 |
| 2003/0198031 A1 * | 10/2003 | Peterson ...................... 361/760 |
| 2009/0113371 A1 | 4/2009 | He et al. |
| 2009/0144688 A1 | 6/2009 | Uchino et al. |
| 2009/0194768 A1 * | 8/2009 | Leedy ............................ 257/48 |
| 2010/0146472 A1 | 6/2010 | Srivastava et al. |
| 2010/0146473 A1 | 6/2010 | Srivastava et al. |
| 2010/0270681 A1 | 10/2010 | Bird et al. |
| 2011/0093828 A1 | 4/2011 | Lee et al. |
| 2012/0106117 A1 * | 5/2012 | Sundaram et al. ............ 361/808 |

* cited by examiner

METHOD AND SYSTEM FOR DESIGNING 3D SEMICONDUCTOR PACKAGE

CROSS-REFERENCE TO RELATED APPLICATION

This application claims priority from Korean Patent Application No. 10-2013-0005996 filed on Jan. 18, 2013 in the Korean Intellectual Property Office, and all the benefits accruing therefrom under 35 U.S.C. 119, the contents of which in its entirety are herein incorporated by reference.

BACKGROUND

1. Technical Field

Exemplary embodiments in accordance with principles of inventive concepts relate to a method and system for designing and manufacturing three-dimensional (3D) semiconductor packages.

2. Description of the Related Art

Electronic devices are typically manufactured and distributed in semiconductor packages. A semiconductor package may include, e.g., one or more semiconductor chips and a package substrate on which the semiconductor chips are mounted.

An electronic packaging approach, SiP (System in Package), which may include an entire system within a single package, may address the demands of high speed and high integration. SiP is being developed in various forms, including: PiP (Package in Package), and PoP (Package on Package) for example.

A Package-on-Package (PoP) approach, in which a package substrate is stacked on a package substrate, has emerged as a high-density, high-performance electronics packaging technique.

In order to produce the PoP, studies on how to design the wiring between packages, i.e., net assignment, to reliably implement the required operating characteristics have been conducted actively.

SUMMARY

In an exemplary embodiment in accordance with principles of inventive concepts, wiring for a three-dimensional semiconductor package is designed by a special purpose processor receiving a first package layout parameter for a plurality of first terminals included in a first package, a second package layout parameter for a plurality of second terminals included in a second package disposed above or below the first package, and a connection terminal layout parameter for a plurality of connection terminals to electrically connect terminals of the first package to terminals of the second package; the special purpose processor providing a first wiring connection layout between the first and second terminals and the connection terminals by applying a first process to the first package, second package, and connection terminal layout parameters; and the special purpose processor providing a second wiring connection layout between the first and second terminals and the connection terminals by applying a second process, which is different from the first process, to the first wiring connection layout.

In an exemplary embodiment in accordance with principles of inventive concepts, at least one of the first package, second package, and connection terminal layout parameters includes a size, number, shape and arrangement of the terminals, a pitch between the terminals, and a thickness of the first or second package.

In an exemplary embodiment in accordance with principles of inventive concepts, providing a first wiring connection layout by applying a first process comprises providing an initial solution by applying a first sub-process to the first package, second package, and connection terminal layout parameters, and providing the first wiring connection layout by applying a second sub-process, which is different from the first sub-process, to the initial solution.

In an exemplary embodiment in accordance with principles of inventive concepts, the first sub-process includes a greedy process, and the second sub-process includes a genetic process.

In an exemplary embodiment in accordance with principles of inventive concepts, providing the first wiring connection layout by applying a second sub-process comprises providing the first wiring connection layout by using the second sub-process in a first range, and when adjusting the first range, a net length and a byte skew of the first wiring connection layout are adjusted.

In an exemplary embodiment in accordance with principles of inventive concepts, the second process includes determining a first reference vector at a center of the first wiring connection layout, sequentially numbering the second terminals and the connection terminals by rotating the first reference vector in a clockwise direction or counterclockwise direction, and connecting the second terminals and the connection terminals having the same number to each other.

In an exemplary embodiment in accordance with principles of inventive concepts, a direction of the first reference vector includes a direction from the center toward control address (CA) connection terminals among the connection terminals.

In an exemplary embodiment in accordance with principles of inventive concepts, the initial solution includes n initial solutions, and the n is a natural number smaller than or equal to the smallest number among the number of the first terminals, the number of the second terminals, and the number of the connection terminals, and providing the first wiring connection layout comprises selecting m (m is a natural number satisfying m≤n) initial solutions from among the n initial solutions, and providing the first wiring connection layout by applying the second sub-process to the m initial solutions.

In an exemplary embodiment in accordance with principles of inventive concepts, providing n initial solutions comprises selecting arbitrary n connection terminals from among the connection terminals, and providing the initial solution for each of the selected n connection terminals.

In an exemplary embodiment in accordance with principles of inventive concepts, before providing the initial solution, providing a base substrate terminal layout parameter for a plurality of third terminals included in a base substrate disposed below the first package, and designing a wiring between the first terminals and the third terminals by using the first and fourth layout parameters.

In an exemplary embodiment in accordance with principles of inventive concepts, designing a wiring between the first terminals and the third terminals comprises designing the wiring by using a greedy process.

In an exemplary embodiment in accordance with principles of inventive concepts, the first package includes an application processor (AP) chip, and the second package includes a memory chip.

In an exemplary embodiment in accordance with principles of inventive concepts, a special purpose processor, includes: a central processing unit; and a storage which stores a module for designing a three-dimensional (3D) net assignment between a plurality of first terminals included in a first package, a plurality of second terminals included in a second package, and connection terminals connecting the first package and the second package by an operation of the central processing unit, wherein the module comprises: receiving a first package layout parameter for the first terminals, a second package layout parameter for the second terminals, and a connection terminal layout parameter for the connection terminals; providing an initial solution for a wiring between the first terminals, the second terminals and the connection terminals by applying a first sub-process to the first package, second package, and connection terminal layout parameters; and providing a first wiring connection layout by applying a second sub-process to the initial solution; and designing the 3D net assignment from the first wiring connection layout by using a second process.

In an exemplary embodiment in accordance with principles of inventive concepts, the initial solution includes n initial solutions, and the n is a natural number smaller than or equal to the smallest number among the number of the first terminals, the number of the second terminals, and the number of the connection terminals, and providing a first wiring connection layout by applying a second sub-process comprises selecting m (m is a natural number satisfying m≤n) initial solutions from among the n initial solutions, and providing the first wiring connection layout by applying the second sub-process to the m initial solutions.

In an exemplary embodiment in accordance with principles of inventive concepts, the module for designing the 3D net assignment further comprises, before providing the initial solution, receiving a base substrate terminal layout parameter for a plurality of third terminals included in a base substrate disposed below the first package, and designing a wiring between the first terminals and the third terminals by using the first and fourth layout parameters.

In an exemplary embodiment in accordance with principles of inventive concepts, a three-dimensional semiconductor device, includes: a first semiconductor package, including first package terminals; a second semiconductor package, including second package terminals; and a substrate, including connection terminals, wherein first package terminals are electrically connected to second package terminals through connection terminals, the connection layout between first package terminals, second package terminals, and connection terminals determined by first and second processes, wherein the first process establishes an initial layout using a plurality of connection terminals as reference points, then refines the layout by selecting initial layouts having preferable net lengths or byte skews, and wherein the second process establishes connections between connection terminals and second package terminals by sweeping connection and second package terminals, numbering the respective terminals in the order in which they are swept, and connecting like-numbered second package terminals to liked-numbered connection terminals.

In an exemplary embodiment in accordance with principles of inventive concepts, the first process includes a greedy process.

In an exemplary embodiment in accordance with principles of inventive concepts, the first process employs first package, second package, and connection terminal layout parameters.

In an exemplary embodiment in accordance with principles of inventive concepts, the first process includes a genetic optimization process.

In an exemplary embodiment in accordance with principles of inventive concepts, the first process includes an optimization process that optimizes the initial layout by dividing the substrate into ranges and optimizing on a range-by-range basis.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
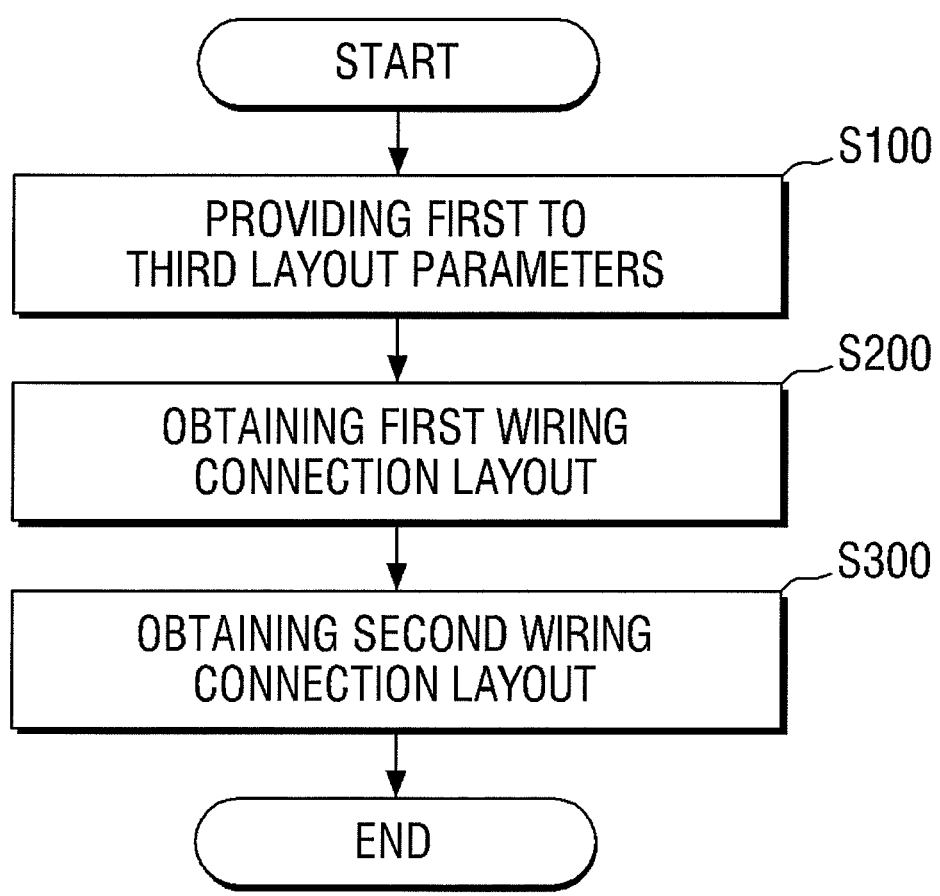
FIG. 1 is a flowchart of a method for designing a 3D semiconductor package in accordance with principles of inventive concepts.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions may be exaggerated for clarity. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on"). The word "or" is used in an inclusive sense, unless otherwise indicated.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "bottom," "below," "lower," or "beneath" other elements or features would then be oriented "atop," or "above," the other elements or features. Thus, the exemplary terms "bottom," or "below" can encompass both an orientation of above and below, top and bottom. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

An exemplary embodiment of a method for designing a three-dimensional (3D) semiconductor package in accordance principles of inventive concepts will be described in the discussion related to FIGS. 1 to 8.

FIG. 1 is a flowchart of an exemplary embodiment of a method for designing a 3D semiconductor package in accordance with principles of inventive concepts.

FIGS. 2 to 8 are diagrams for illustrating an exemplary embodiment of a method for designing a 3D semiconductor package in accordance with principles of inventive concepts.

Figure 2:
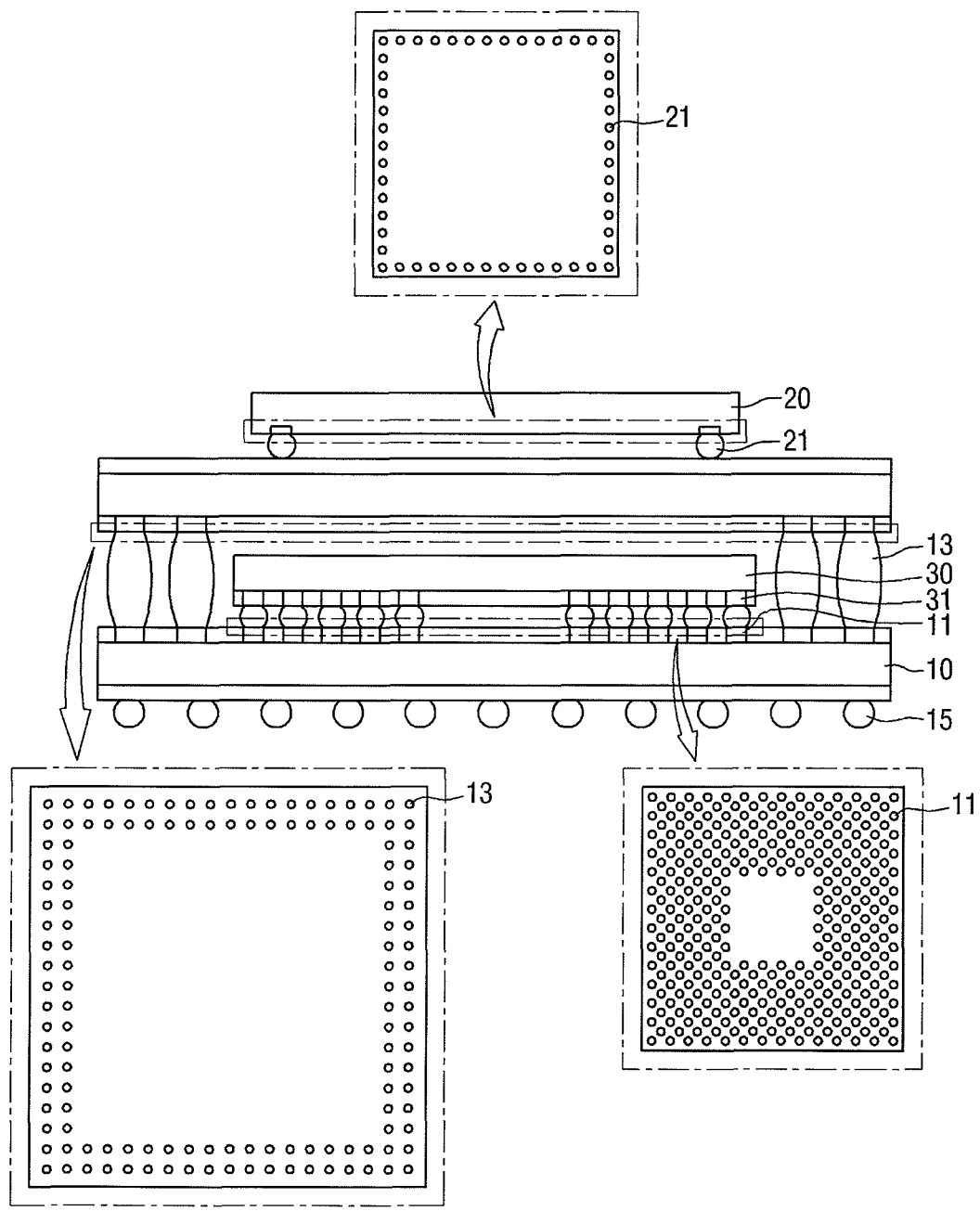
FIGS. 2 to 8 are diagrams for explaining a method for designing a 3D semiconductor package in accordance with principles of inventive concepts.

Referring to FIGS. 1 and 2, a first layout parameter for a plurality of first terminals 31 (also referred to herein as a first set of terminals 31) included in a first package 30, a second layout parameter for a plurality of second terminals 21 (also referred to herein as a second set of terminals 21) included in a second package 20 disposed above the first package 30, and a connection terminal layout parameter for a plurality of connection terminals 13 electrically connecting the first package 30 and the second package 20 are provided (S100).

The cross-sectional view of an exemplary embodiment of a package on package (PoP) to be manufactured of FIG. 2 includes a base substrate 10 that may include a plurality of third terminals 11 (also referred to herein as a third set of terminals 11) and a plurality of balls 15. The third terminals 11 included in the base substrate 10 may be electrically connected to the first terminals 31 included in the first package 30 disposed on the base substrate 10, for example. The balls 15 may be employed to connect the base substrate 10 to another package or another substrate that is not shown in FIG. 2, for example. First terminals 31 may be referred to herein as first package terminals 31, second terminals 21 may be referred to herein as second package terminals 21, third terminals 11 may be referred to herein as base substrate terminals 11, and terminals 13 may be referred to herein as connection terminals 13.

The base substrate 10 and the second package 20 may be connected to each other through the connection terminals 13. The second package 20 may be disposed above the first package 30, and may include the second terminals 21. In an exemplary embodiment in accordance with principles of inventive concepts, the second terminals 21 of the second package 20 may be connected to the first terminals 31 of the first package 30 through the connection terminals 13 and the third terminals 11. That is, in an exemplary embodiment, the second package 20 may be connected to the first package 30 through the base substrate 10.

Although an embodiment in which the first package 30 is disposed between the base substrate 10 and the second package 20 has been illustrated in FIG. 2, inventive concepts are not limited thereto, and each package may be disposed in various ways, as would be apparent to those skilled in the art. For example, the second package 20 may be disposed below the first package 30.

The first through third terminals 31, 21 and 11, may electrically connect the packages to each other and each terminal may be implemented as a conductive ball. For example, the first terminals 31 may be re-distribution layer (RDL) bumps, the connection terminals 13 may be joint balls, the second terminals 21 may be balls of the second package 20, and the third terminals 11 may be balls of the base substrate 10.

In an exemplary embodiment in accordance with principles of inventive concepts, the first layout parameter includes information related to the first terminals 31 and the first package 30. For example, the first layout parameter may include the size, number, shape and arrangement of the first terminals 31, the pitch between the first terminals 31, the thickness of the first package 30, and the like. That is, first layout parameters may be physical attributes of the first semiconductor package 30 and associated terminals 31 that may affect wiring layout, such as size, number, shape, pitch between, and arrangement of terminals 31 on the first package and thickness of first package, for example. First layout parameters may also be referred to herein, simply, as first package layout parameters.

In an exemplary embodiment in accordance with principles of inventive concepts, the second layout parameter includes information related to the second terminals 21 and the second package 20. For example, the second layout parameter may include the size, number, shape and arrangement of the second terminals 21, the pitch between the second terminals 21, the thickness of the second package 20, and the like. That is, second layout parameters may be physical attributes of the second semiconductor package 20 and associated terminals 21 that may affect wiring layout, such as size, number, shape, pitch between, and arrangement of terminals on the second package and thickness of second package 20, for example. Second layout parameters may also be referred to herein, simply, as second package layout parameters.

In an exemplary embodiment in accordance with principles of inventive concepts, the third layout parameter includes information related to the connection terminals 13. For example, the third layout parameter may include the size, number, shape and arrangement of the connection terminals 13, the pitch between the connection terminals 13, the thickness of the connection terminals 13, and the like. That is, third layout parameters may be physical attributes of connection terminals 13 that may affect wiring layout, such as, size, number, shape, pitch between, and arrangement of connection terminals 13. Third layout parameters may also be referred to herein, simply, as connection terminal layout parameters.

In an exemplary embodiment in accordance with principles of inventive concepts, the first package 30 and the second package 20 may be packages including semiconductor chips of different types. The first and second packages 30 and 20 may be formed by a Package on Package (PoP) packaging method, as illustrated. In exemplary embodiments in accordance with principles of inventive concepts, the, the first package 30 may include a processor chip, such as an application processor (AP) chip, and the second package 20 may include a memory chip, such as a DRAM, for example, but inventive concepts are not limited thereto.

Referring again to FIG. 1, in an exemplary embodiment in accordance with principles of inventive concepts, a first wiring connection layout between the first and second terminals and the connection terminals is obtained by applying a first process to the first package, second package, and connection terminal layout parameters (that is, the first through third layout parameters) (S200).

Referring to FIG. 2, terminals of the first set of terminals 31 are connected to the connection terminals 13 through terminals of the third set of terminals 11, and the connection terminals 13 are connected to terminals of the second set of terminals 21. That is, first package terminals 31 are connected to substrate terminals 11, and through them, to connection terminals 13, which are, in turn, connected to second package terminals 21. In other words, first package terminals 31 are connected to second package terminals 21 in a path through substrate terminals 11 and connection terminals 13. Accordingly, there is a need to form a wiring, or inter-connection, that connects the first terminals 31 to the connection terminals 13, and a wiring, or inter-connection, that connects the connection terminals 13 to the second terminals 21. The first process is used to form the wiring between the first terminals 31 and the connection terminals 13 and the wiring between the connection terminals 13 and the second terminals 21. In an exemplary embodiment in accordance with principles of inventive concepts, first terminals 31 are matched one-to-one to the connection terminals 13, and the second terminals 21 are also matched one-to-one to the connection terminals 13. That is, one of connection terminals 13 is connected to one of the first terminals 31 and one of the second terminals 21.

Figure 3:
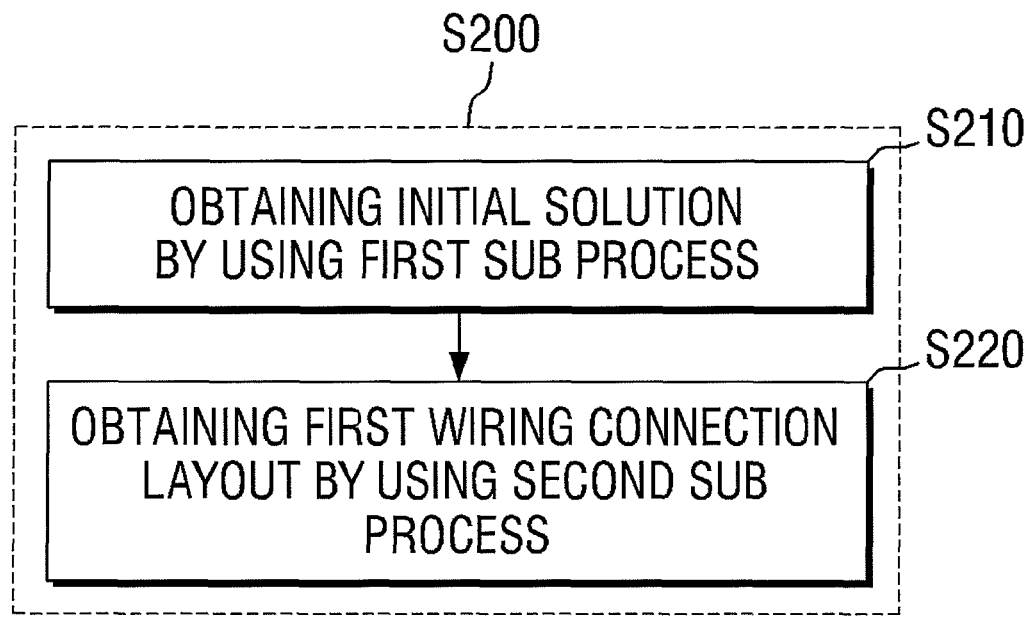
Figure 4:
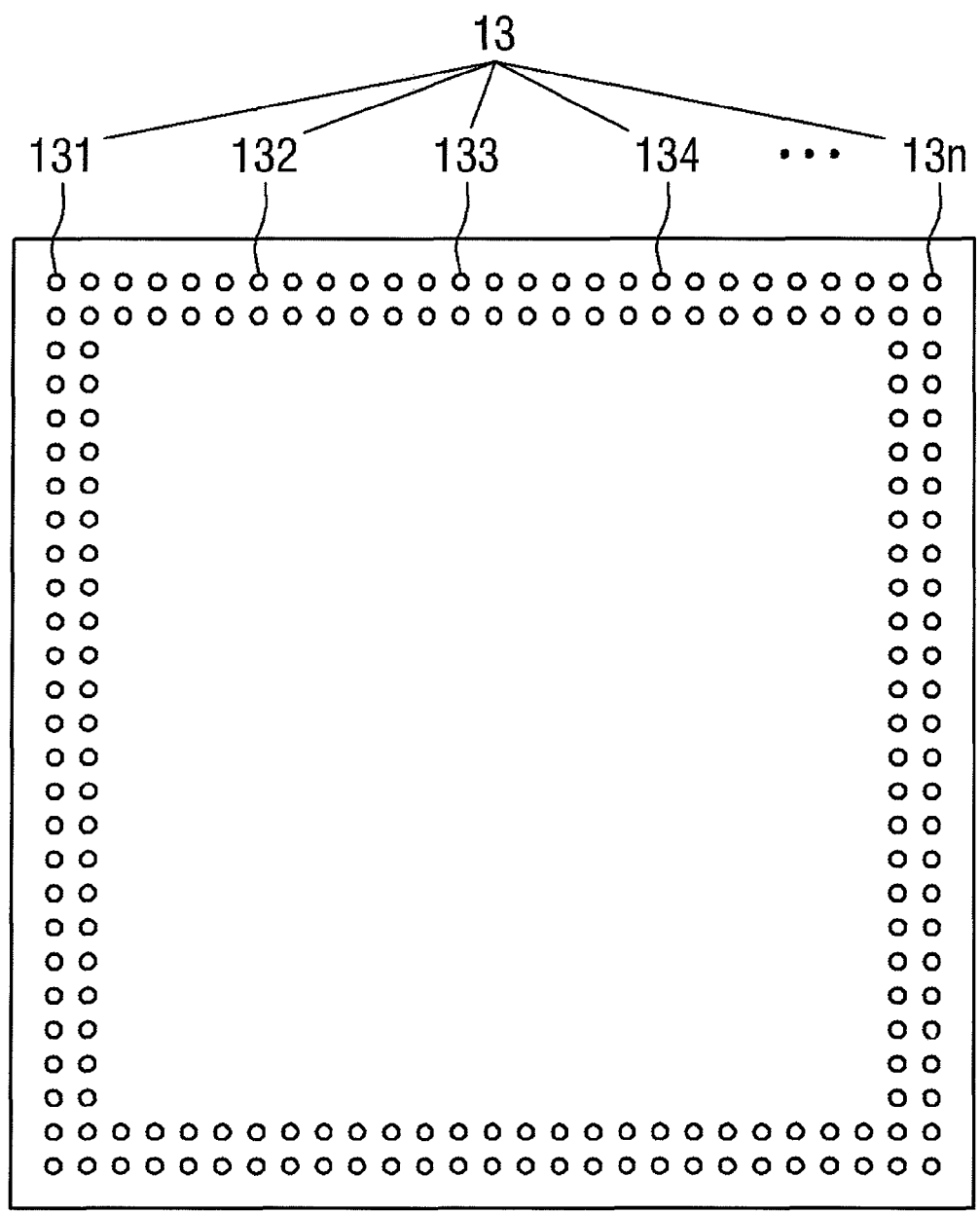

An exemplary process of obtaining the first wiring connection layout in accordance with principles of inventive concepts will be described in greater detail in the discussion related to FIG. 3, in which an initial solution is obtained by applying a first sub-process to the first package, second package, and connection terminal layout parameters (S210).

In an exemplary embodiment in accordance with principles of inventive concepts, the first sub-process determines how to connect terminals in the first set of terminals 31 to the connection terminals 13, and to connect terminals in the second set of terminals 21 to the connection terminals 13 and to, thereby, design the wiring, or inter-connection. The first sub-process designs the wiring between the terminals by using the first package, second package, and connection terminal layout parameters, and the initial solutions are a wiring design obtained by using the first sub-process.

In an exemplary embodiment in accordance with principles of inventive concepts, the first sub-process may be a greedy process, as described in greater detail below. In operation, one connection terminal from among the connection terminals 13 is selected, and the greedy process is applied to the terminal. When using the greedy process, the wiring between the first terminals 31 and the connection terminals 13 and the wiring between the second terminals 21 and the connection terminals 13 are designed as the shortest distance from a reference point, thereby yielding an initial solution. However, the first sub-process is not limited to greedy processes, and any process capable of forming the wiring between the first terminals 31 and the connection terminals 13 and the wiring between the second terminals 21 and the connection terminals 13 may be used in accordance with principles of inventive concepts.

In an exemplary embodiment in accordance with principles of inventive concepts, a plurality of initial solutions may be obtained by using a plurality of reference points. For example, referring to FIG. 4, among the connection terminals 13, n connection terminals 131 to 13$n$ may be selected. Then, based on the n connection terminals 131 to 13$n$, n initial solutions may be obtained for the n connection terminals 13, respectively. In an exemplary embodiment in accordance with principles of inventive concepts, n is a natural number smaller than or equal to the smallest number among the number of the first terminals 31, the number of the second terminals 21, and the number of the connection terminals 13.

Figure 5:
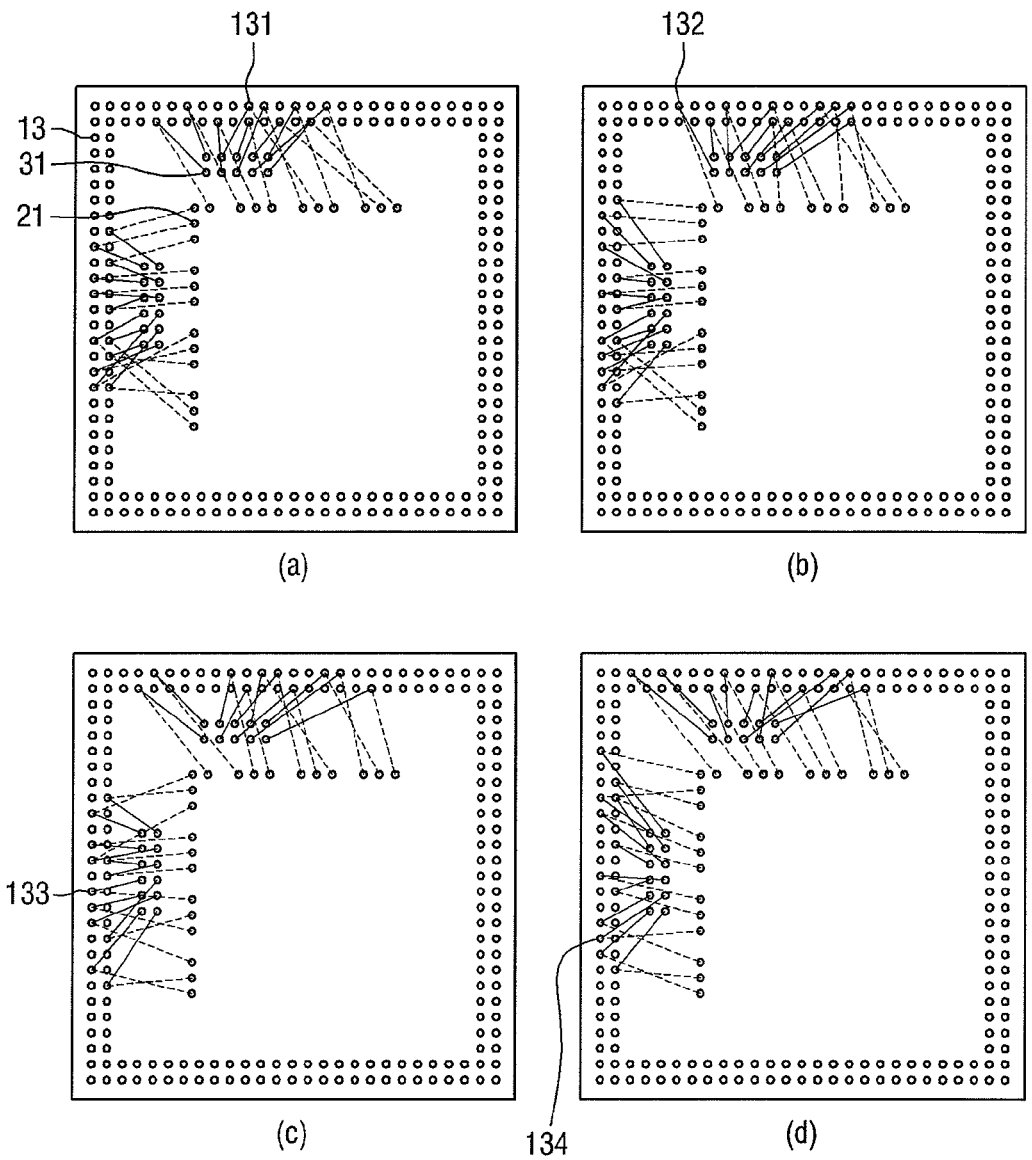

When using a greedy process, for example, as shown in FIG. 5, initial solutions can be obtained. In FIG. 5, (a) represents a first initial solution obtained based on a first reference point 131, (b) represents a second initial solution obtained based on a second reference point 132, (c) represents a third initial solution obtained based on a third reference point 133, and (d) represents a fourth initial solution obtained based on a fourth reference point 134.

In the exemplary embodiment in accordance with principles of inventive concepts of FIG. 5, only a portion of the first terminals 31 and some of the second terminals 21, and a portion of the wiring between the first terminals 31 and the connection terminals 13 and between the second terminals 21 and the connection terminals 13 have been illustrated, for clarity of explanation. The same illustrative technique applies to the following drawings, where only a fraction of the first terminals 31, some of the second terminals 21 and a portion of the wirings have been illustrated. The entire wiring of the present invention will, nevertheless, be understood by those skilled in the art.

Referring again to FIG. 3, in an exemplary embodiment in accordance with principles of inventive concepts, the first wiring connection layout may be obtained using a second sub-process (S220). In particular, the first wiring connection layout may be obtained by applying a second sub-process, one different from the first sub-process, to the initial solution obtained through the first sub-process. In the initial solution, using the first sub-process, the wiring is designed based on a reference point determined from among the connection terminals 13 and the net length and byte skew are not taken into consideration. In an exemplary embodiment in accordance with principles of inventive concepts, the second sub-process optimizes the initial solution by adjusting net length and byte skew, and the optimized initial solution, produced by the second sub-process, is the first wiring connection layout.

In an exemplary embodiment in accordance with principles of inventive concepts, the term "net length" may refer to an average length of the wiring connecting one of the first terminals 31, one of the connection terminals 13, and one of the second terminals 21. The term "byte skew" may refer to a time difference of signals transmitted through different paths in the wirings. The byte skew is associated with the standard deviation of the net length, and the null byte skew may be reduced as the standard deviation of the net length is reduced.

In an exemplary embodiment in accordance with principles of inventive concepts, the second sub-process may be a genetic process, for example. However, inventive concepts are not limited thereto, and any optimization process may be used to optimize the initial solution and, thereby, may be the second sub-process.

Because a genetic optimization technique does not derive a predetermined result value, the design of the second wiring connection layout may differ whenever the second wiring connection layout is obtained by using a genetic optimization process.

Figure 6:
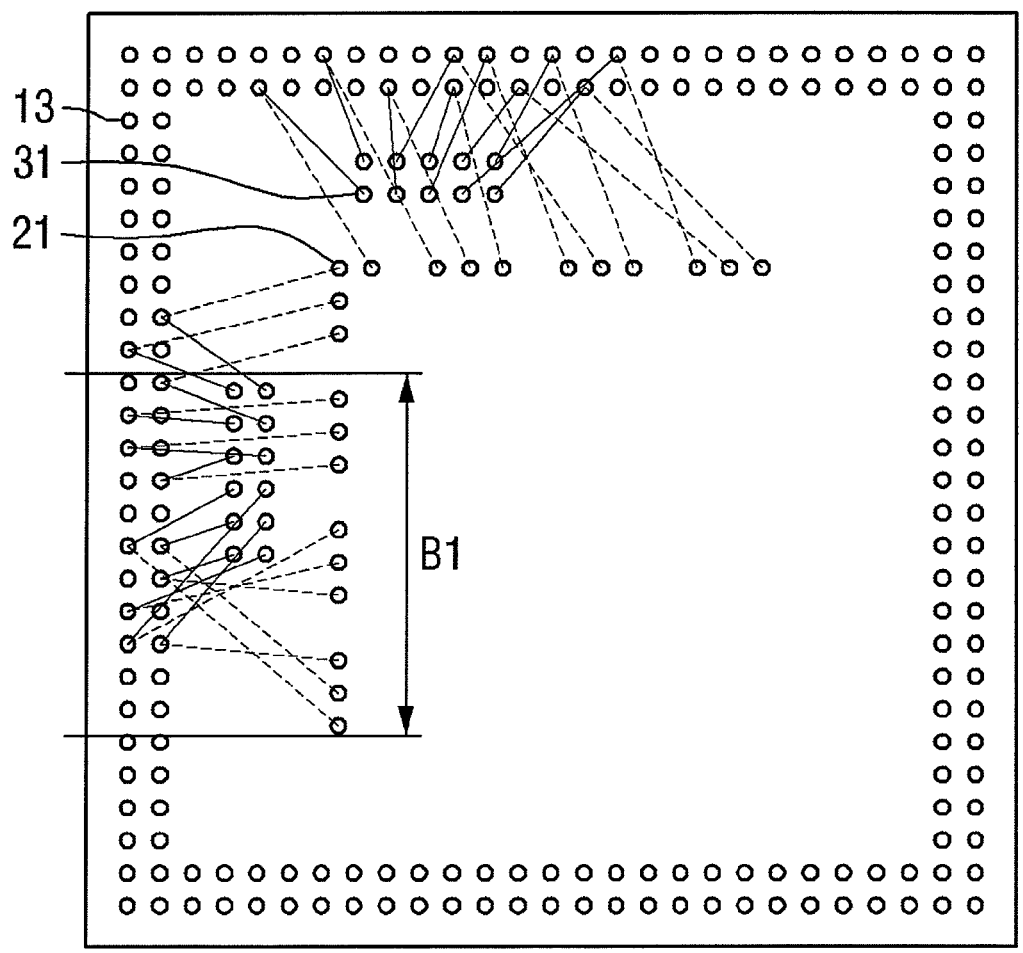

In an exemplary embodiment in accordance with principles of inventive concepts, the first wiring connection layout may be obtained by applying the second sub-process to the entire initial solution, or the first wiring connection layout may be obtained by dividing the initial solution into ranges and applying the second sub-process to each range as illustrated in FIG. 6, in which a first range B1 is determined in the initial solution, and the second sub-process is applied to the first range B1. In this exemplary embodiment, wiring is designed only between the first terminals 31 and the connection terminals 13 and second terminals 21 included in the first range B1. The width of the first range B1 can be adjusted.

When employing a first range such as range B1, also referred to herein as a predetermined range, in the initial solution and applying the second sub-process to the range, the first wiring connection layout may be obtained more quickly and efficiently than when applying the second sub-process to the entire initial solution. Additionally, in accordance with principles of inventive concepts, by adjusting the first range B1, one may readily adjust the net length and byte skew of the first wiring connection layout.

In an exemplary embodiment in accordance with principles of inventive concepts, when obtaining n initial solutions, the first wiring connection layout can be obtained by applying the second sub-process to the n initial solutions. That is, m initial solutions may be selected from among n initial solutions, where m may be a natural number satisfying m≤n, and m may be adjusted arbitrarily. The selected m initial solutions may be selected because their net length and/or byte skew are relatively good among the n initial solutions. The first wiring connection layout may then be obtained by applying the second sub-process to the selected m initial solutions. In an exemplary embodiment in accordance with principles of inventive concepts, the m initial solutions may be divided into certain ranges (e.g., first range B1), and the initial solution, the net length and byte skew of which are the most desirable (that is, shortest net length and least byte skew) in the first range B1, may be selected. In an exemplary embodiment in accordance with principles of inventive concepts a first wiring connection layout may be produced in this manner. Using n initial solutions to produce a first wiring connection layout simplifies the operation of the second sub-process (compared to using a single initial solution) and, as a result, the first wiring connection layout may be produced more rapidly when employing n initial solutions.

Although an exemplary embodiment in accordance with principles of inventive concepts in which the first process includes a first sub-process and a second sub-process has been described, inventive concepts are not limited thereto, and any process capable of obtaining the first wiring connection layout by optimizing the net length and byte skew may be the first process.

Referring again to FIG. 1, in an exemplary embodiment in accordance with principles of inventive concepts, a second process, different from the first process, may be applied to the first wiring connection layout to produce a second wiring connection layout between the first and second terminals 31 and 21 and the connection terminals 13 (S300). The second wiring connection layout may be the final optimized net assignment.

Figure 7:
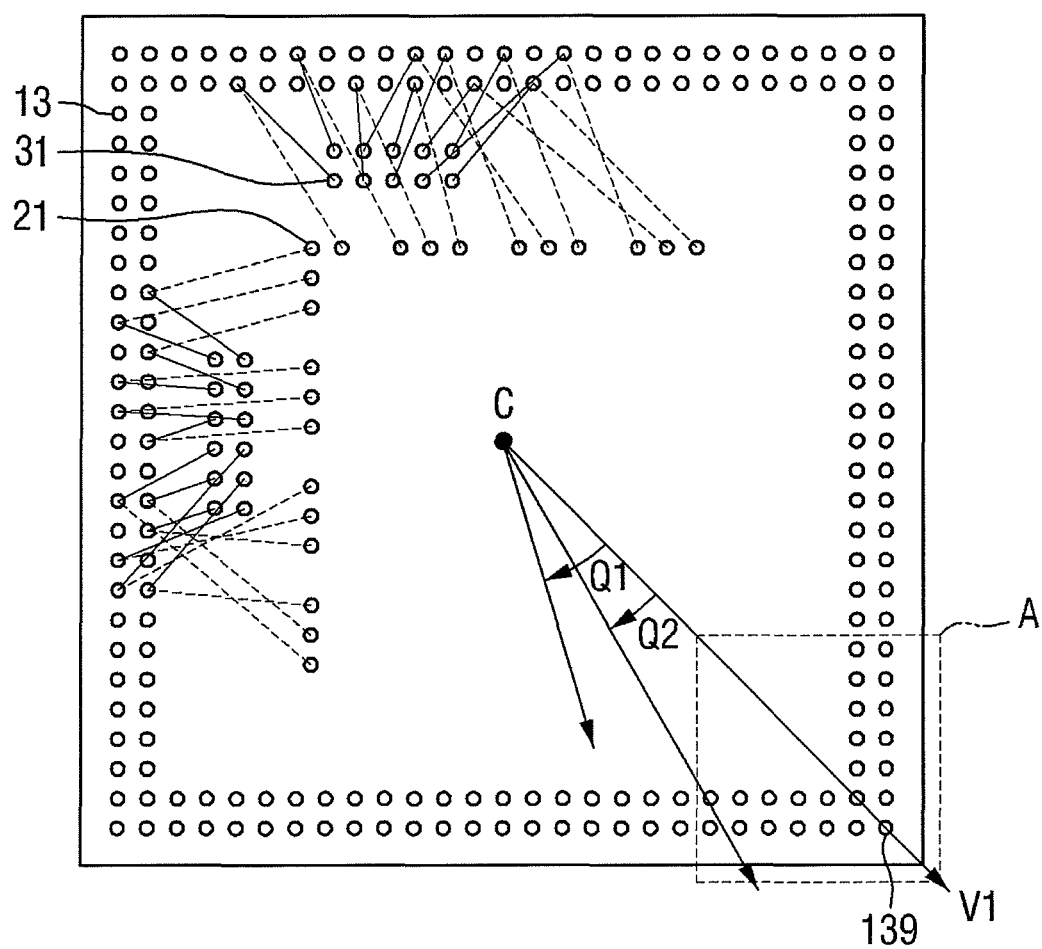

An exemplary embodiment of a method of producing a second wiring layout in accordance with principles of inventive concepts is illustrated in FIG. 7. With such a method a second wiring connection layout may be obtained using a second process, as will be described in greater detail in the discussion related to FIGS. 7 and 8. Referring to FIG. 7, a first reference vector V1 is established, projecting from center C of the first wiring connection layout, in the direction of terminal 139 in this exemplary embodiment. Then, by rotating the first reference vector V1 in a clockwise direction, second terminals 21 swept by the first reference vector V1 are numbered sequentially (Q1), and the connection terminals 13 which intersect the path of the first reference vector V1 are numbered sequentially (Q2). Then, the second terminals 21 and the connection terminals 13 having the same number are connected to each other. In an exemplary embodiment in accordance with principles of inventive concepts, this second process is only applied to the wiring between the connection terminals 13 and the second terminals 21, and is not applied to the wiring between the connection terminals 13 and the first terminals 31.

Although, in this exemplary embodiment, the first reference vector V1 is rotated clockwise inventive concepts are not limited thereto. For example, the second terminals 21 and the connection terminals 13 may be numbered sequentially by rotating the first reference vector V1 in a counterclockwise direction. Additionally, the initial direction of the first reference vector V1, that is, the direction from center C, may be determined arbitrarily. For example, the direction of the first reference vector V1 may be toward any one of the control address (CA) connection terminals transmitting a CA signal among the connection terminals 13. In FIG. 7, the CA connection terminals are gathered in section A on the lower right side, and the first reference vector V1 is oriented toward a first CA connection terminal 139 among the CA connection terminals. In the section A where the CA connection terminals are formed, the wiring between the connection terminals 13 and the second terminals 21 is relatively uncomplicated. That is, the number of wires connecting the first package 30 and the second package 20 is relatively small, and such a choice eases the interconnection process. That is, for example, if the direction of the first reference vector V1 were established toward a portion where the wiring between the connection terminals 13 and the second terminals 21 is complicated, the connection terminals 13 and the second terminals 21 are crowded, and it may be difficult to determine the first one of the connection terminals 13 or the first one of the second terminals 21.

Figure 8:
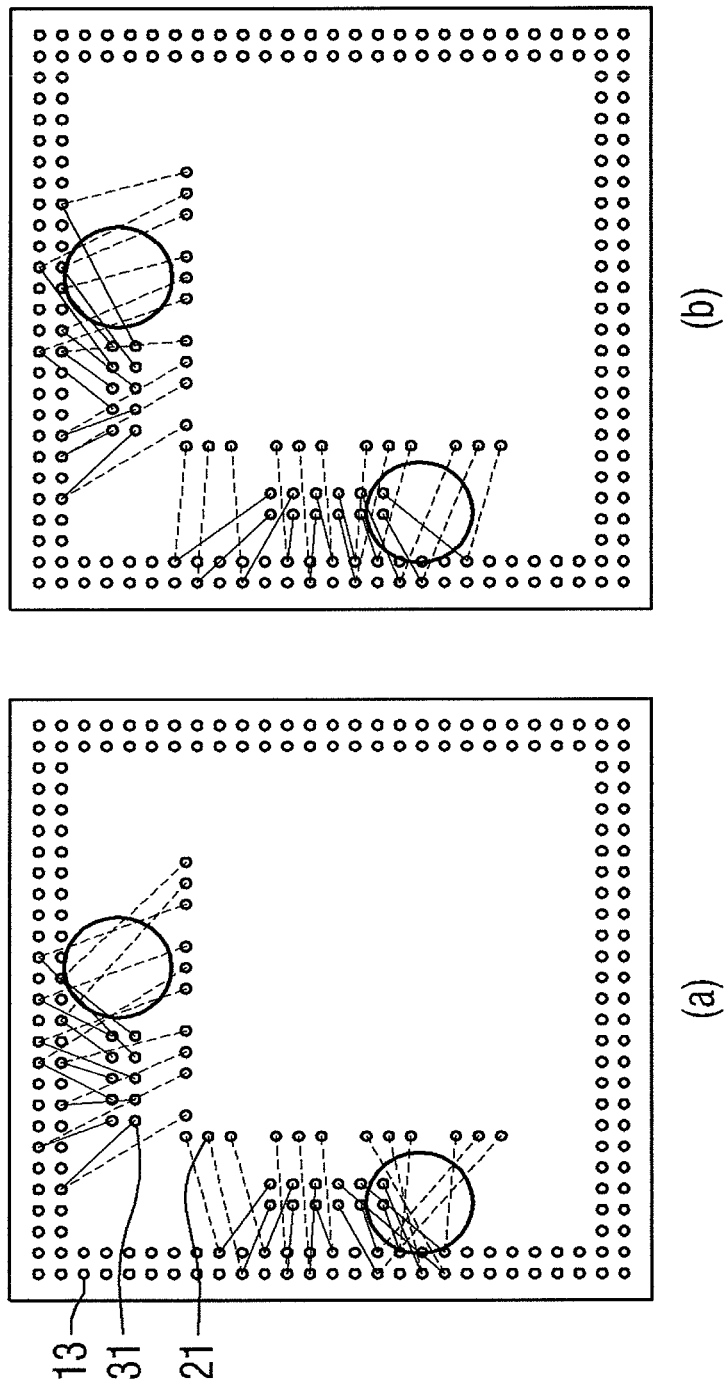

When forming the wiring between packages, the wires should not overlap because a short circuit may occur, and that may prevent the delivery of signals to the proper terminals. Accordingly, one design parameter holds that the wires are not to overlap each other, even if avoiding wire overlap has a negative impact net length or byte skew. FIGS. 8(*a*) and 8(*b*) illustrate first and second wiring connection layouts, respectively, produced in accordance with principles of inventive concepts. Comparing (a) and (b) of FIG. 8, it can be seen that the wires do not overlap each other in the second (b) wiring connection layout unlike the first wiring connection layout (a). The second, desirable, wiring connection layout may be obtained using a first and second process in accordance with principles of inventive concepts, as just described. Producing 3D semiconductor packages using interconnections produced in accordance with principles of inventive concepts may significantly reduce the time and expense required to produce 3D semiconductor packages.

Another exemplary method for designing a 3D semiconductor package in accordance with principles of inventive concepts will be described with reference to FIGS. 2, 9 and 10. For brevity and clarity of description, repetition of previously described concepts will be avoided, with emphasis placed on differences between previously described concepts and those of this exemplary embodiment.

Figure 9:
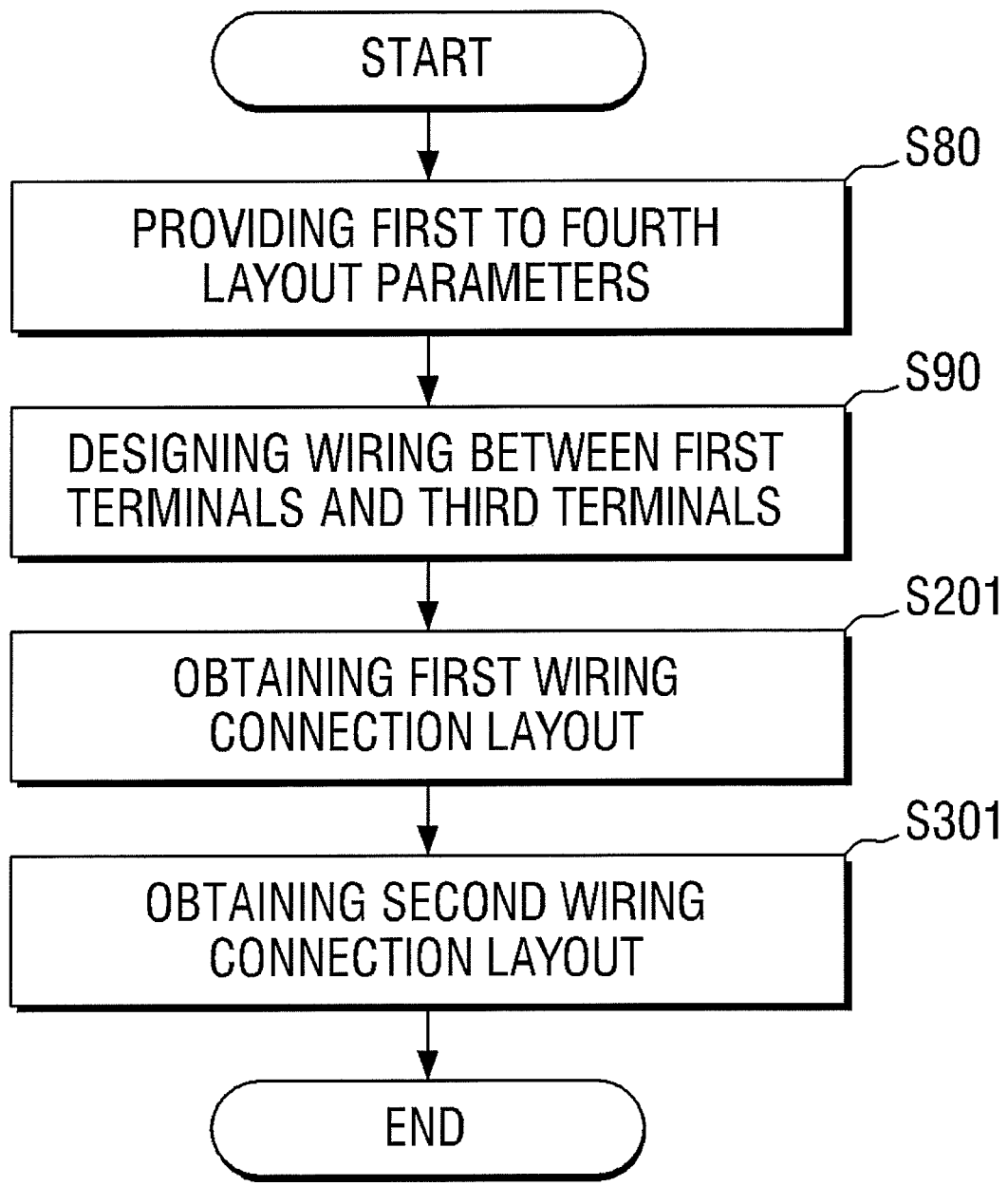
FIG. 9 is a flowchart illustrating a method for designing a 3D semiconductor package in accordance with principles of inventive concepts.
Figure 10:
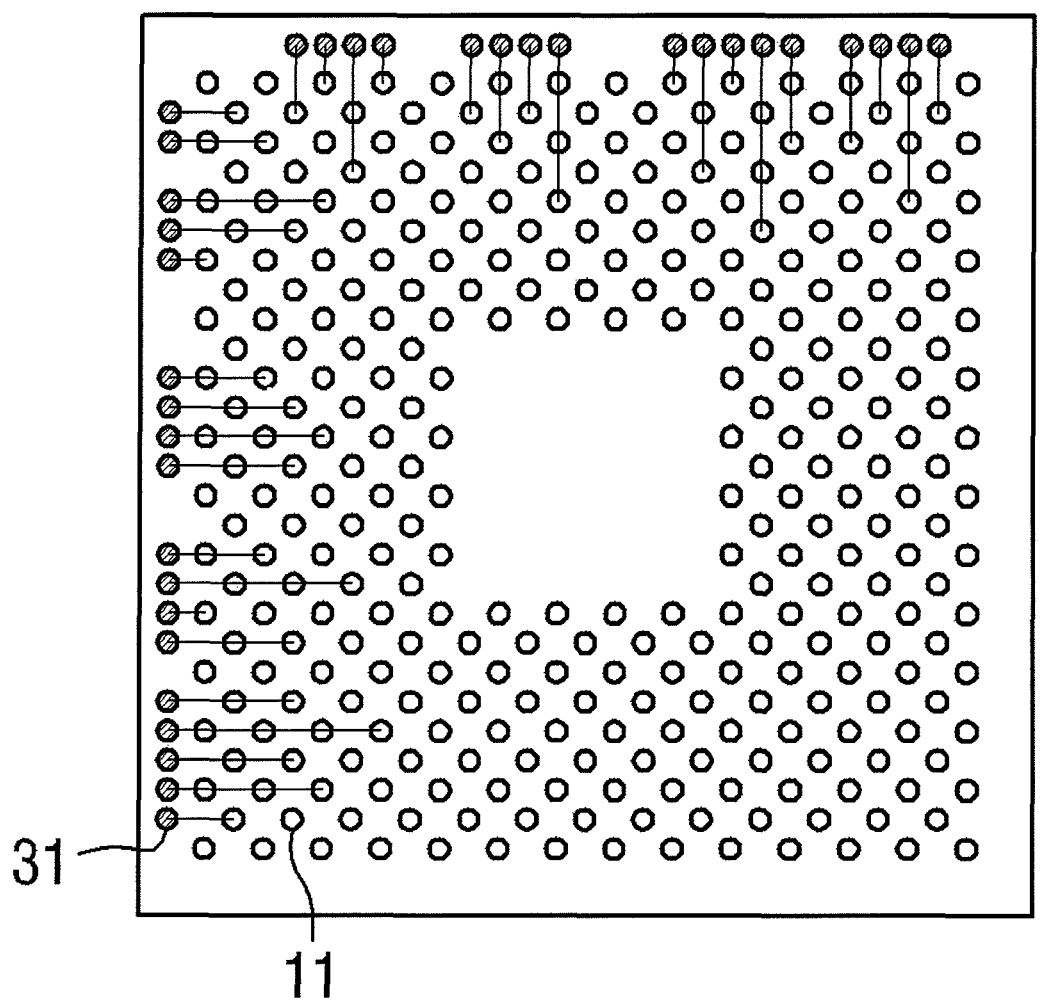
FIG. 10 is a diagram for explaining a method for designing a 3D semiconductor package in accordance with principles of inventive concepts.

FIG. 9 is a flowchart illustrating an exemplary method in accordance with principles of inventive concepts for designing a 3D semiconductor package. FIG. 10 is a diagram for explaining an exemplary method for designing a 3D semiconductor package in accordance with principles of inventive concepts.

Referring to FIGS. 2 and 9, first through fourth layout parameters are provided (S80). The fourth layout parameter may be a layout parameter for the third terminals 11 included in the base substrate 10. The fourth layout parameter may include the size, number, shape and arrangement of the third terminals 11, the pitch between the third terminals 11, and the thickness of the third terminals 11, for example. That is, fourth layout parameter may be physical attributes of third terminals 11, or base substrate terminals 11, that may affect wiring layout, such as, size, number, shape, pitch between, and arrangement of base substrate terminals 11. Fourth layout parameters may also be referred to herein, simply, as base substrate terminal layout parameters.

The wiring between the first terminals 31 and the third terminals 11 may be designed using the first and fourth parameters (S90). As shown in FIG. 10, the first terminals 31 and the third terminals 11 may be connected to each other, using, for example, a greedy process to determine the interconnections.

In accordance with principles of inventive concepts, in this exemplary embodiment, wiring connecting the base substrate 10 to the first package 30 may be designed before obtaining the first wiring connection layout, more particularly, before obtaining the initial solution. Accordingly, the entire wiring between the first package 30, the second package 20 and the base substrate 10 can be automatically designed.

After designing the wiring between the first terminals 31 and the third terminals 11 using the first and fourth parameters, obtaining the first wiring connection layout (S201) and obtaining the second wiring connection layout (S301) may be accomplished as described above and, therefore, a description thereof will not be repeated here.

Figure 12:
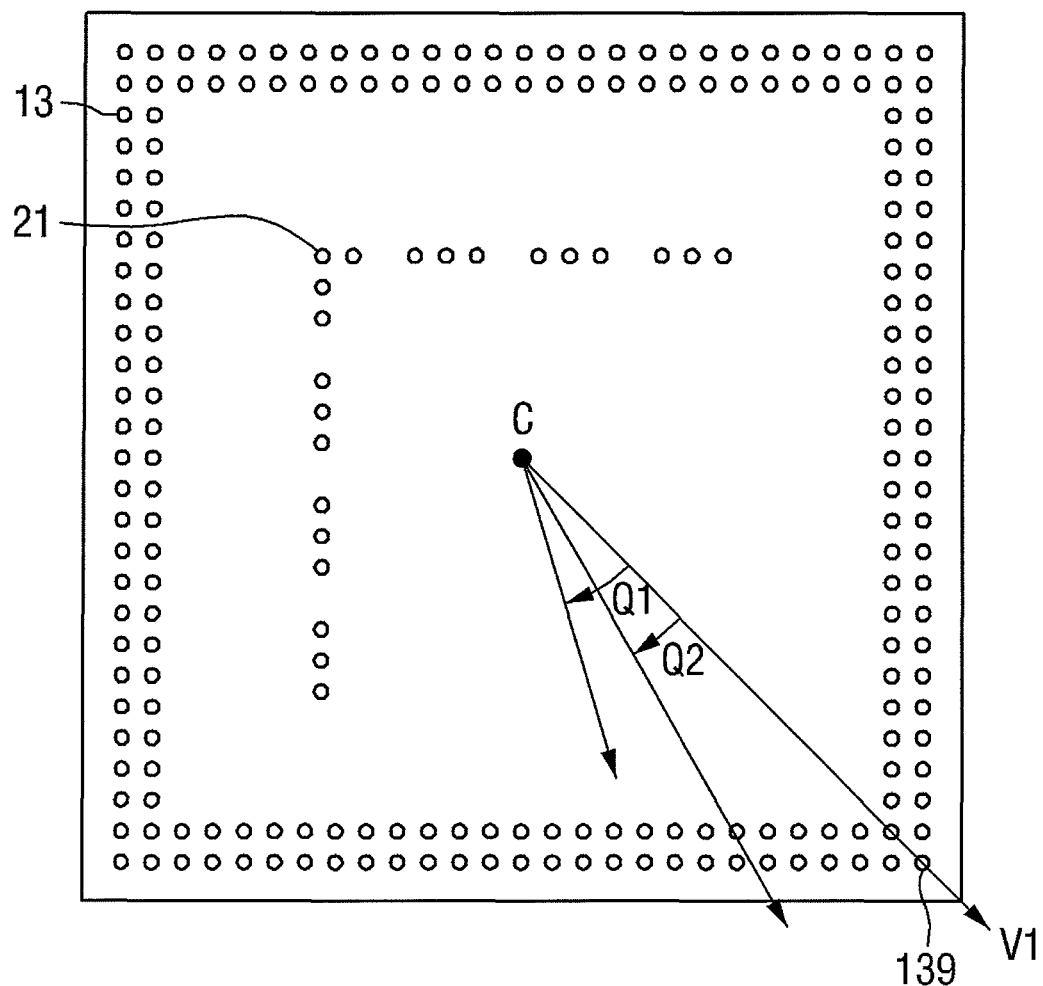
FIGS. 12 and 13 are diagrams for explaining a method for designing a 3D semiconductor package in accordance with principles of inventive concepts.
Figure 13:
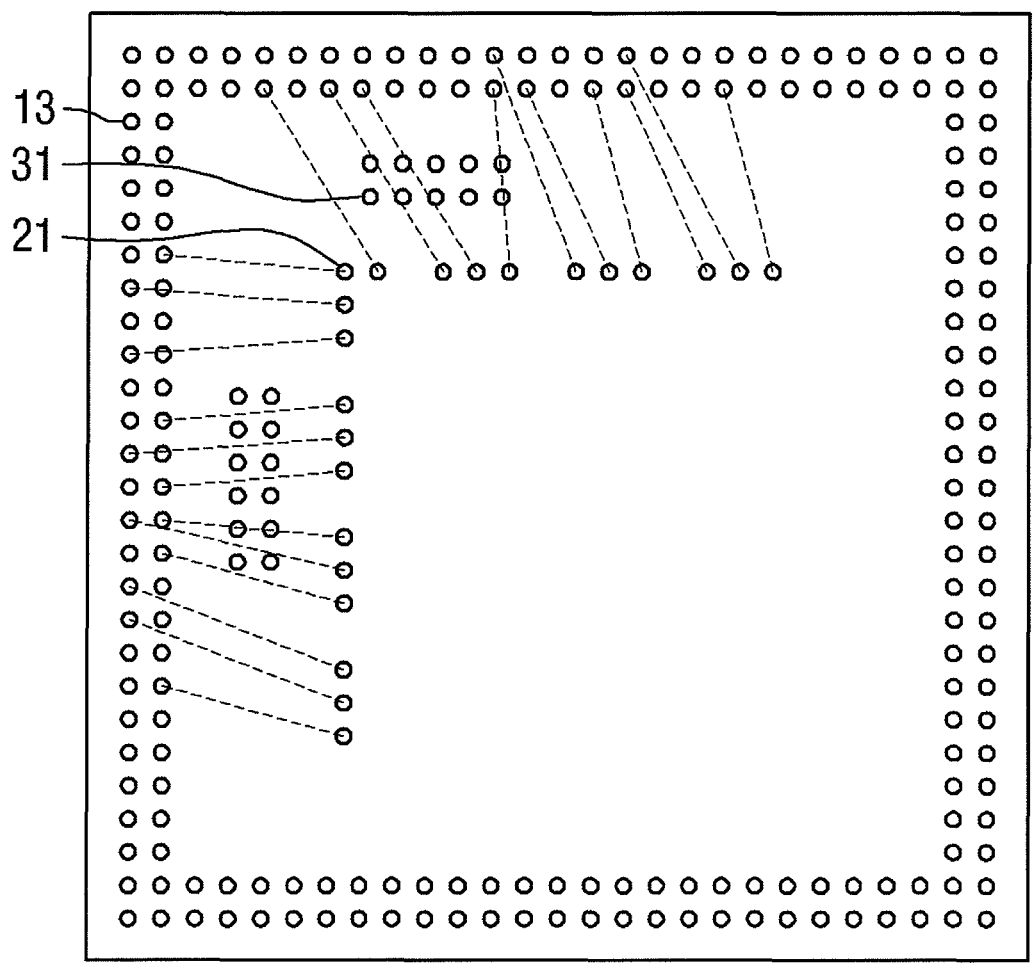

Another exemplary method for designing a 3D semiconductor package in accordance principles of inventive concepts will be described with reference to FIGS. 11 to 13. For brevity and clarity of description, repetition of previously described concepts will be avoided, with emphasis placed on differences between previously described concepts and those of this exemplary embodiment.

Figure 11:
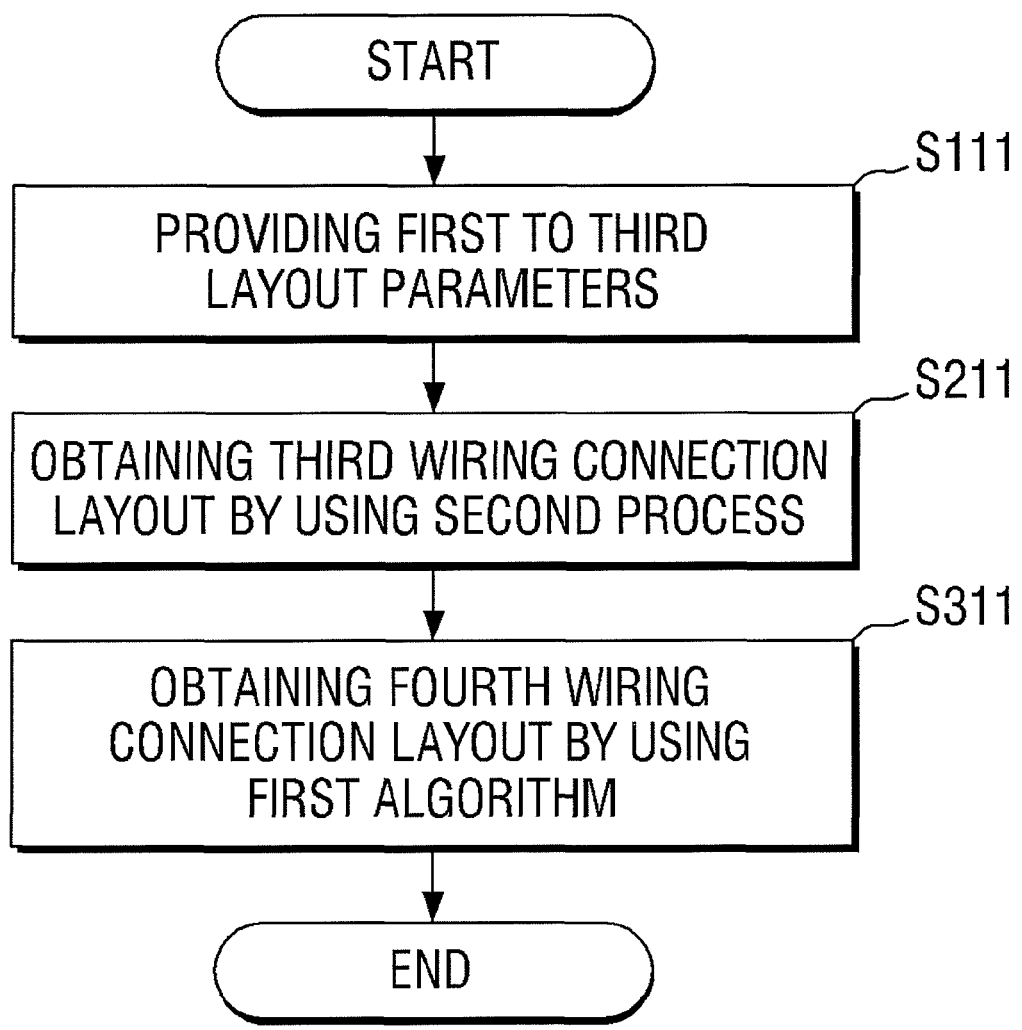
FIG. 11 is a flowchart illustrating a method for designing a 3D semiconductor package in accordance with principles of inventive concepts.

FIG. 11 is a flowchart illustrating an exemplary method in accordance with principles of inventive concepts for designing a 3D semiconductor package. FIGS. 12 and 13 are diagrams for illustrating a method for designing a 3D semiconductor package according to another exemplary embodiment in accordance with principles of inventive concepts.

Referring to FIG. 11, first package, second package, and connection terminal layout parameters are provided (S111). Then, a third wiring connection layout is obtained by applying the second process to the first package, second package, and connection terminal layout parameters (S211). In this exemplary embodiment in accordance with principles of inventive concepts, the wiring between the connection terminals 13 and the second terminals 21 may be designed first. In this exemplary embodiment, as illustrated in FIG. 12, the first reference vector V1 is established, projecting from center C of the first wiring connection layout, in the direction of a connection terminal 13 (terminal 139 in this exemplary embodiment), and the second terminals 21 and the connection terminals 13 are numbered sequentially by rotating the first reference vector V1 in a clockwise or counterclockwise direction (Q1, Q2). Second terminals 21 and connection terminals 13 having the same number are connected to each other. In this manner a third wiring connection layout is developed, as illustrated in FIG. 13.

Referring again to FIG. 11, in accordance with principles of inventive concepts, a fourth wiring connection layout may be obtained by applying the first process to the third wiring connection layout (S311). In particular, the fourth wiring connection layout may be obtained by taking into consideration the net length and the byte skew between the first terminals 31, the connection terminals 13, and the second terminals 21, and, at the same time, maintaining the wiring between the connection terminals 13 and the second terminals 21 designed in the third wiring connection layout. The fourth wiring connection layout is an optimized net assignment, just as the second wiring connection layout is. The fourth wiring connection layout is produced in the same manner as the first process of the method for designing a 3D semiconductor package in accordance with principles of inventive concepts, except that the wiring between the connection terminals 13 and the second terminals 21 included in the third wiring connection is used "as is:" that is, without changing the wiring between the connection terminals 13 and the second terminals 21 when using the first process.

A computing system, also referred to herein as a special purpose processor, for designing a 3D net assignment in accordance with principles of inventive concepts and the operation thereof will be described with reference to FIGS. 14 and 15.

Figure 14:
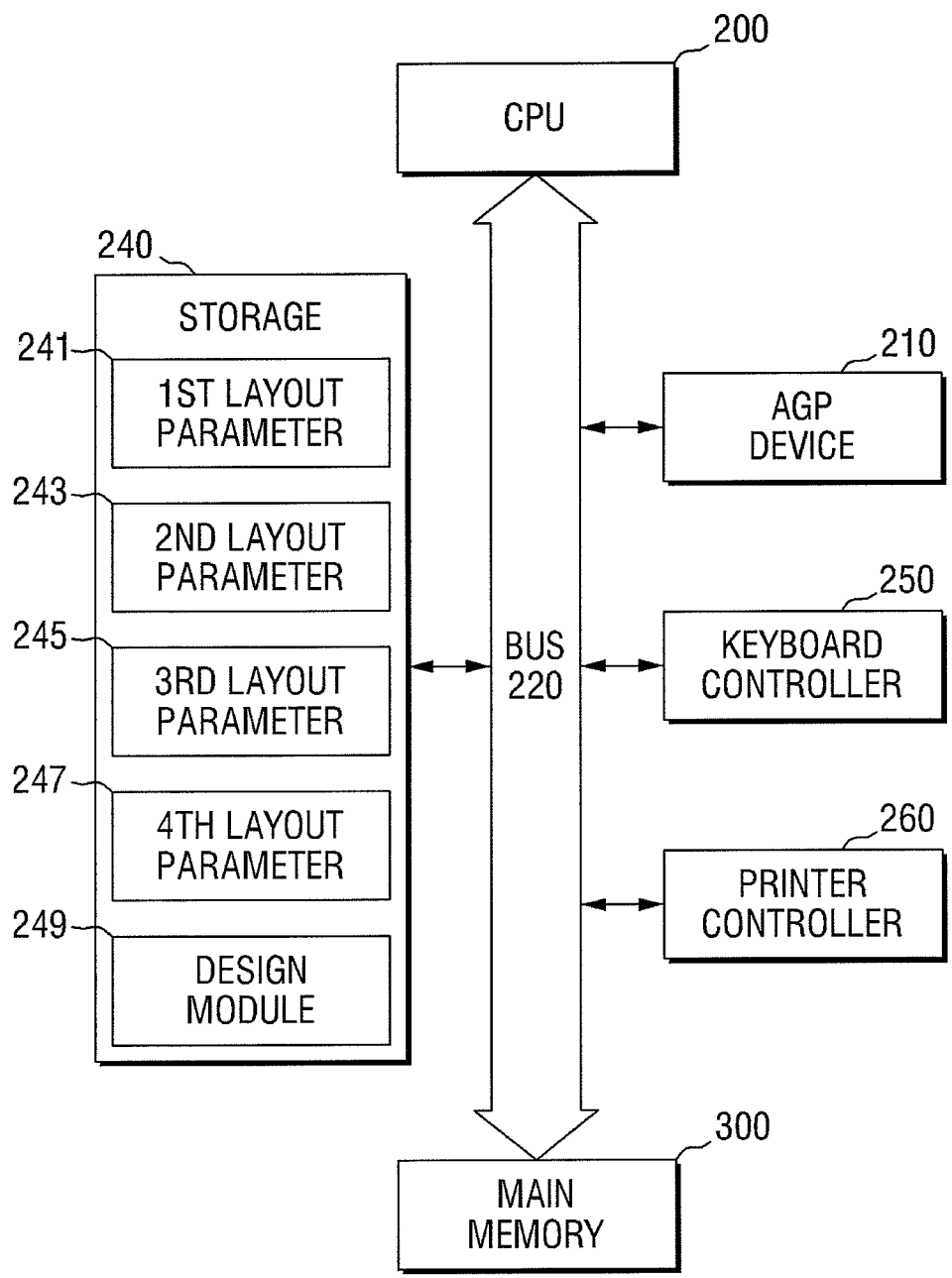
FIG. 14 shows an example of a special purpose processor using a module for designing a 3D net assignment in accordance with principles of inventive concepts.

FIG. 14 shows an example of a computing system, or special purpose processor, for designing a 3D net assignment in accordance with principles of inventive concepts. FIG. 15 is a diagram for illustrating the operation of the special purpose processor of FIG. 14.

First, referring to FIG. 14, the method for designing a 3D semiconductor package in accordance with principles of inventive concepts may be implemented, for example, to be employed by special purpose processor 201.

Special purpose processor 201 may employ, for example, a software module or hardware components, such as a field programmable gate array (FPGA) or an application specific integrated circuit (ASIC), which performs certain tasks.

A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables, for example.

Referring to FIG. 14, the special purpose processor 201 may include a central processing unit (CPU) 200, an accelerated graphics port (AGP) device 210, a main memory 300, a storage 240 (e.g., SSD, HDD, etc.), a bus 220, a keyboard controller 260, and a printer controller 250, for example. Although only the above-described components have been illustrated as components included in the special purpose processor 201, inventive concepts are not limited thereto. That is, additional components may be included in the special purpose processor 201, or some of the components shown in FIG. 14 may be omitted.

The block diagram of the special purpose processor 201 shown in FIG. 14 may be a block diagram of a desktop or laptop computer adapted for a semiconductor packaging process. However, inventive concepts are not limited thereto.

In the special purpose processor 201, the CPU 200, the AGP device 210, the storage 240, the keyboard controller 260, the printer controller 250, the main memory 300, various peripheral devices (not shown) and the like may be connected to the bus 220. However, inventive concepts are not limited thereto, and the bus 220 may be modified to be included in the CPU 200.

AGP is a bus standard for implementing the representation of 3D graphics at a high speed. The AGP device 210 may include a video card reproducing monitor images or the like.

The CPU 200 may perform various operations required for driving the special purpose processor 201, and execute an OS and an application program.

The main memory 300 may load and store data required to perform the operation of the CPU 200 from the storage 240. As an example of the memory implementing the main memory 300, a random access memory (DRAM) may be mentioned, but inventive concepts are not limited thereto.

In an exemplary embodiment in accordance with principles of inventive concepts, storage 240 is a large capacity storage device storing data and the like, and may be implemented as a computer-readable recording medium such as HDD and SSD, but inventive concepts are not limited thereto. Further, although the storage 240 is connected to the bus 220 in the special purpose processor 201 in accordance with principles of inventive concepts, inventive concepts are not limited thereto. The storage 240 may be modified to be directly connected to the CPU 200, for example.

If the special purpose processor 201 in accordance with principles of inventive concepts employs the method for designing a 3D semiconductor package in accordance with principles of inventive concepts that is implemented as, e.g., software or the like, the method for designing a 3D semiconductor package may be stored as a program or the like in the storage 240 or a design module 249.

Specifically, the storage 240 may store the design module 249 which performs the method for designing a 3D semiconductor package in accordance with exemplary embodiments in accordance with principles of inventive concepts, i.e., designs the 3D net assignment.

The storage 240 may store a first package layout parameter 241 for the first terminals, a second package layout parameter 243 for the second terminals, a connection terminal layout parameter 245 for the connection terminals, and a base substrate terminal layout parameter 247 for the third terminals, which are provided as an input in order to perform the method for designing a 3D semiconductor package in exemplary embodiments in accordance with principles of inventive concepts.

For example, the design module 249 and the first through fourth parameters 241 to 247 stored in the storage 240 may be loaded in the main memory 300 and processed by the operation of the CPU 200. Thus, the 3D net assignment between the first terminals included in the first package, the second terminals included in the second package, and the connection terminals connecting the first package and the second package may be designed.

This operation will be described in more detail with reference to FIG. 15.

Figure 15:
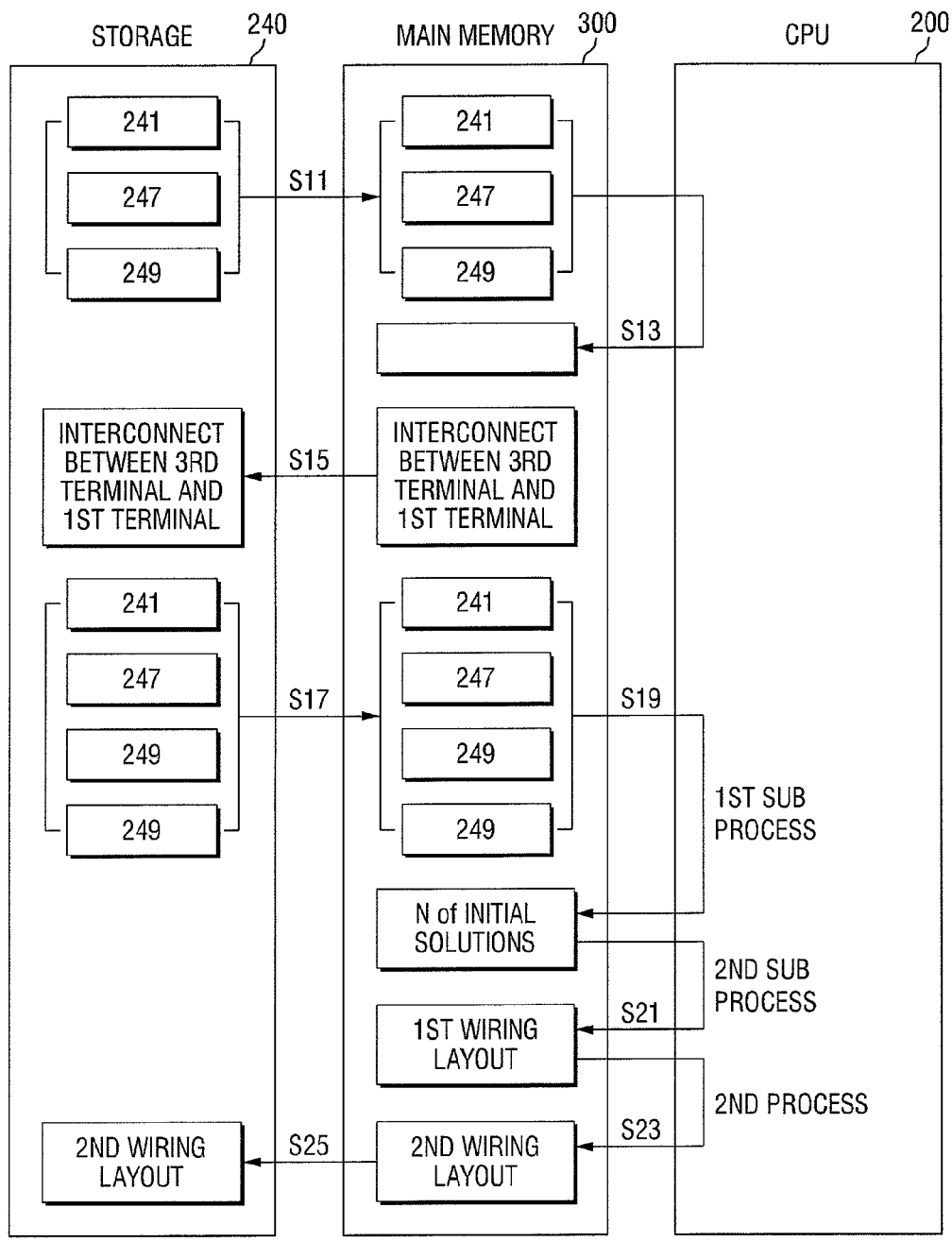
FIG. 15 is a diagram for explaining an operation of the special purpose processor of FIG. 14.

Referring to FIG. 15, first, the design module 249, the first package layout parameter 241, and the base substrate terminal layout parameter 247 stored in the storage 240 are loaded in the main memory 300 to be processed by the CPU 200 (S11). Subsequently, the CPU 200 may perform a procedure implemented in the design module 249 by the input of the first package layout parameter 241 and the base substrate terminal layout parameter 247, thereby designing the wiring between the first terminals included in the first package and the third terminals included in the base substrate disposed below the first package by using the first and fourth layout parameters 241 and 247 (S13). Then, the wiring between the first terminals and the third terminals are moved to the storage 240 from the main memory 300 and stored in the storage 240 (S15).

Then, the first package, second package, and connection terminal layout parameters 241 to 245 and the design module 249 are loaded in the main memory 300 to be processed by the CPU 200 (S17). Subsequently, the CPU 200 performs a procedure implemented in the design module 249 by the input of the first package, second package, and connection terminal layout parameters 241 to 245, thereby designing the second wiring connection layout, i.e., the 3D net assignment. In exemplary embodiments in accordance with principles of inventive concepts, first, the design module 249 loaded in the main memory 300 obtains the initial solution for the wiring between the first terminals, the second terminals and the connection terminals by using the first sub-process (S19). The number of initial solutions may be n, where n is a natural number smaller than or equal to the smallest number among the number of the first terminals, the number of the second terminals, and the number of the connection terminals.

Then, the first wiring connection layout is obtained by applying the second sub-process to the initial solution loaded in the main memory 300 (S21). If the number of the initial solutions is n, the first wiring connection layout may be obtained by selecting m (m is a natural number satisfying m≤n) initial solutions among the n initial solutions, and applying the second sub-process to the m initial solutions. In such an embodiment, the m initial solutions are initial solutions, the net length and/or byte skew characteristics of which are preferred (that is, fall within a range of acceptable values), and are selected from among the n initial solutions.

Although an exemplary embodiment in accordance with principles of inventive concepts in which the n initial solutions and the first wiring connection layout are loaded in only the main memory 300 has been illustrated, they may be moved to the storage 240 and stored in the storage 240.

Then, the 3D net assignment is designed from the first wiring connection layout by applying the second process to the first wiring connection layout (S23). In exemplary embodiments in accordance with principles of inventive concepts, the generated 3D net assignment may be moved to the storage 240 from the main memory 300 and stored in the storage 240 (S25).

The 3D net assignment stored in the storage 240 may be used to manufacture the wiring between the packages of the PoP.

While the present inventive concept has been particularly shown and described with reference to exemplary embodiments thereof, it will be understood by those of ordinary skill in the art that various changes in form and details may be made therein without departing from the spirit and scope of present inventive concepts as defined by the following claims. It is therefore desired that exemplary embodiments be considered in all respects as illustrative and not restrictive, reference being made to the appended claims rather than the foregoing description to indicate the scope of inventive concepts.

What is claimed is:

1. A method for designing a 3D semiconductor package, comprising:
   a special purpose processor receiving a first package layout parameter for a plurality of first terminals included in a first semiconductor package, a second package layout parameter for a plurality of second terminals included in a second semiconductor package disposed above or below the first package, and a connection terminal layout parameter for a plurality of connection terminals to electrically connect terminals of the first semiconductor package to terminals of the second semiconductor package;
   the special purpose processor generating a first wiring connection layout between the first and second terminals and the connection terminals by applying a first process to the first package, second package, and connection terminal layout parameters, wherein said generating a first wiring connection layout by applying a first process comprises generating an initial solution by applying a first sub-process to the first semiconductor package, second semiconductor package, and connection terminal layout parameters, and generating the first wiring connection layout by applying a second sub-process, which is different from the first sub-process, to the initial solution; and
   the special purpose processor generating a second wiring connection layout between the first and second terminals and the connection terminals by applying a second process, which is different from the first process, to the first wiring connection layout, wherein the second process includes determining a first reference vector at a center of the first wiring connection layout, sequentially numbering the second terminals and the connection terminals by rotating the first reference vector in a clockwise direction or counterclockwise direction, and connecting the second terminals and the connection terminals having the same number to each other.

2. The method of claim 1, wherein at least one of the first semiconductor package, second semiconductor package, and connection terminal layout parameters includes a size, number, shape and arrangement of the terminals, a pitch between the terminals, and a thickness of the first or second semiconductor package.

3. The method of claim 1, wherein the first sub-process includes a greedy process, and the second sub-process includes a genetic process.

4. The method of claim 3, wherein said generating the first wiring connection layout by applying a second sub-process comprises generating the first wiring connection layout by using the second sub-process in a first range, and when adjusting the first range, a net length and a byte skew of the first wiring connection layout are adjusted.

5. The method of claim 1, wherein a direction of the first reference vector includes a direction from the center toward control address (CA) connection terminals among the connection terminals.

6. The method of claim 1, wherein the initial solution includes n initial solutions, and the number n is a natural number smaller than or equal to the smallest number among the number of the first terminals, the number of the second terminals, and the number of the connection terminals, and
   wherein said generating the first wiring connection layout comprises selecting m initial solutions, wherein m is a natural number satisfying m≤n, from among the n initial solutions, and generating the first wiring connection layout by applying the second sub-process to the m initial solutions.

7. The method of claim 6, wherein said generating n initial solutions comprises selecting arbitrary n connection terminals from among the connection terminals, and generating the initial solution for each of the selected n connection terminals.

8. The method of claim 1, further comprising, before generating the initial solution, generating a base substrate terminal layout parameter for a plurality of third terminals included in a base substrate disposed below the first semiconductor package, and designing a wiring between the first terminals and the third terminals by using the first and fourth layout parameters.

9. The method of claim 8, wherein said designing a wiring between the first terminals and the third terminals comprises designing the wiring by using a greedy process.

10. The method of claim 1, wherein the first semiconductor package includes an application processor (AP) chip, and the second package includes a memory chip.

11. A special purpose processor, comprising:
    a central processing unit; and
    a storage which stores a module for designing a three-dimensional (3D) net assignment between a plurality of first terminals included in a first semiconductor package, a plurality of second terminals included in a second semiconductor package disposed above or below the first semiconductor package, and connection terminals connecting the first semiconductor package and the second semiconductor package by an operation of the central processing unit,
    wherein the module comprises:
    receiving a first package layout parameter for the first terminals, a second package layout parameter for the second terminals, and a connection terminal layout parameter for the connection terminals to electrically connect terminals of the first semiconductor package to terminals of the second semiconductor package;

generating an initial solution for a wiring between the first terminals, the second terminals and the connection terminals by applying a first sub-process to the first semiconductor package, second semiconductor package, and connection terminal layout parameters wherein said generating a first wiring connection layout by applying a first sub-process comprises generating solution by applying a first sub-process to the first semiconductor package, second semiconductor package, and connection terminal layout parameters, and generating the first wiring connection layout by applying a second sub-process, which is different from the first sub-process, to the initial solution; and generating a first wiring connection layout by applying a second sub-process to the initial solution, wherein the second sub process includes determining a first reference vector at a center of the first wiring connection layout, sequentially numbering the second terminals and the connection terminals by rotating the first reference vector in a clockwise direction or counterclockwise direction, and connecting the second terminals and the connection terminals having the same number to each other; and designing the 3D net assignment from the first wiring connection layout by using a second process.

12. The special purpose processor of claim 11, wherein the initial solution includes n initial solutions, and the number n is a natural number smaller than or equal to the smallest number among the number of the first terminals, the number of the second terminals, and the number of the connection terminals, and wherein said generating a first wiring connection layout by applying a second sub-process comprises selecting m initial solutions, wherein m is a natural number satisfying m≤n, from among the n initial solutions, and generating the first wiring connection layout by applying the second sub-process to the m initial solutions.

13. The special purpose processor of claim 11, wherein the module for designing the 3D net assignment further comprises, before generating the initial solution, receiving a base substrate terminal layout parameter for a plurality of third terminals included in a base substrate disposed below the first semiconductor package, and designing a wiring between the first terminals and the third terminals by using the first and fourth layout parameters.

* * * * *